US010690355B2

(12) United States Patent
Bareyt et al.

(10) Patent No.: US 10,690,355 B2
(45) Date of Patent: Jun. 23, 2020

(54) OVENS AND INSULATION PRODUCTS FOR OVENS

(71) Applicant: SAINT-GOBAIN ISOVER, Courbevoie (FR)

(72) Inventors: Christophe Bareyt, Saint-Leu d'Esserent (FR); David Gogeon, Villers St Paul (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 58 days.

(21) Appl. No.: 15/850,624

(22) Filed: Dec. 21, 2017

(65) Prior Publication Data

US 2018/0172284 A1    Jun. 21, 2018

(30) Foreign Application Priority Data

Dec. 21, 2016   (FR) ...................... 16 62958

(51) Int. Cl.
*B32B 19/06* (2006.01)
*F27D 1/00* (2006.01)
(Continued)

(52) U.S. Cl.
CPC .............. *F24C 15/34* (2013.01); *B32B 19/06* (2013.01); *F16L 59/04* (2013.01); *F27D 1/0009* (2013.01);
(Continued)

(58) Field of Classification Search
CPC ... F27D 1/00; F24C 15/34; F24C 3/00; B32B 19/06
(Continued)

(56) References Cited

U.S. PATENT DOCUMENTS 3,422,809 A * 1/1969 Perry .................... F24C 14/025
126/21 A
4,556,202 A * 12/1985 Yamura ................. F27D 1/0009
266/242
(Continued)

FOREIGN PATENT DOCUMENTS

EP        2708128 A2    3/2014
FR        2907189 A1    4/2008
(Continued)

OTHER PUBLICATIONS

EP2116753 A1, Saint Gobain, Thermal Insulation Product, of year Nov. 2009 of France—12 pages English M/c translation.*
(Continued)

*Primary Examiner* — Edelmira Bosques
*Assistant Examiner* — Nikhil P Mashruwala
(74) *Attorney, Agent, or Firm* — Element IP, PLC

(57) ABSTRACT

A device operates at high temperature, especially up to 550° C. and in particular between 50 and 350° C., such as an oven or an oven part. The device includes at least one insulating product formed of at least two layers, including a first layer, placed towards the heating zone and/or the heating element (s) to be insulated, formed of mineral wool(s) and/or fibre(s) and having a density of less than 120 kg/m$^3$, and a second layer, further away, chosen from insulators formed of aerogel(s) or of amorphous silica or vacuum insulators or any other superinsulator. Additionally, an insulating product is appropriate for this device.

22 Claims, 2 Drawing Sheets

(51) Int. Cl.
*F24C 15/34* (2006.01)
*F16L 59/04* (2006.01)
*B32B 7/12* (2006.01)

(52) U.S. Cl.
CPC ......... *F27D 1/0013* (2013.01); *F27D 1/0016* (2013.01); *B32B 7/12* (2013.01); *B32B 2262/101* (2013.01); *B32B 2262/105* (2013.01); *B32B 2307/304* (2013.01); *B32B 2315/085* (2013.01); *B32B 2571/00* (2013.01)

(58) Field of Classification Search
USPC .......................................................... 126/1 F
See application file for complete search history.

(56) References Cited

U.S. PATENT DOCUMENTS

| | | | | |
|---|---|---|---|---|
| 6,607,851 | B2* | 8/2003 | DiChiara, Jr. | .......... B32B 19/04 |
| | | | | 244/121 |
| 6,758,206 | B1* | 7/2004 | Barnes | .................. F24C 15/006 |
| | | | | 126/15 R |
| 7,223,717 | B2* | 5/2007 | Omata | .................... B41M 5/42 |
| | | | | 428/32.39 |
| 7,252,868 | B2* | 8/2007 | Suda | ......................... B32B 5/24 |
| | | | | 428/74 |
| 9,482,436 | B1* | 11/2016 | Hettinger | .............. F24C 15/008 |
| 9,513,017 | B2* | 12/2016 | Choudhary | ............. F24C 15/34 |
| 10,203,120 | B2* | 2/2019 | Hofmann | ................. F24C 15/34 |
| 2003/0215640 | A1 | 11/2003 | Ackerman et al. | |
| 2008/0246379 | A1* | 10/2008 | Choudhary | ............. F24C 15/34 |
| | | | | 312/400 |
| 2013/0196137 | A1 | 8/2013 | Evans et al. | |
| 2018/0339491 | A1* | 11/2018 | Hursit | ....................... B32B 5/32 |
| 2019/0077700 | A1* | 3/2019 | Xu | ......................... C03C 14/002 |
| 2019/0170369 | A1* | 6/2019 | Pons Y Moll | ............ B32B 5/20 |

FOREIGN PATENT DOCUMENTS

| | | | |
|---|---|---|---|
| WO | WO-03064025 | A1 | 8/2003 |
| WO | WO-2008047027 | A1 | 4/2008 |

OTHER PUBLICATIONS

Search Report dated Sep. 18, 2017 in French Patent Application No. 1662958, filed Dec. 21, 2016.

\* cited by examiner

OVENS AND INSULATION PRODUCTS FOR OVENS

BACKGROUND

The present invention relates to an installation (or an appliance or device) capable of operating at high temperature, in particular at temperatures of up to 550° C. and in particular of between 50 and 350° C., such as a cooking oven, in particular an oven intended for domestic use, and also to a thermal insulation product suited to the insulation of the said installation or the said oven, in particular suited to the insulation of heating boxes of the said ovens.

It is known to insulate oven parts, for example the heating (or cooking) enclosure (or chamber or box or muffle), in order to protect, from the heat or from overheating, the components (in particular electronic components) present around the enclosure or the external parts of the oven or, if appropriate, the item of furniture incorporating the oven, this insulation also making it possible to avoid heat losses to the outside of the enclosure and to improve the energy performance qualities of the oven during its use. The insulators used have to be in a position to withstand the high temperatures with which they are (at least temporarily) confronted and to retain their performance qualities (in particular mechanical or sufficient insulating performance qualities) at these temperatures without risk of deterioration or of emissions potentially dangerous to the health.

Ovens are generally insulated with fibrous insulators based on synthetic fibres, such as glass wall or rock wool, in particular by using felts or mats of mineral wool, which are installed or inserted, generally manually, around the enclosure. As the thickness and the density of the layers of mineral wools used is, however, limited by the capacities of the existing manufacturing lines, this can result in poorly insulated zones (thickness inappropriate for filling the changing spaces or reliefs of the oven housings) and thermal bridges, it being possible for this reason for the energy consumption of these normal ovens to remain relatively high.

In order to reduce the disadvantages related to the direct handling of mineral wool (irritation of the skin, dusts), the document WO 93/01444 furthermore provides for the insulation of objects such as ovens to be carried out by spraying a fibrous mineral material with simultaneous wetting of the fibres by water and/or a binder, followed by the shaping of the sprayed layer and then by the drying/hardening of the shaped layer. However, this technique presents problems of cleaning the work place, the various treatments carried out being in addition more expensive in time than that necessary for the positioning of conventional insulators, and it is difficult to control the amount of material deposited and to obtain a homogeneous density. The document WO 2001/036859 also provides an improved process in which the insulation is this time formed by insufflation of flocks of mineral wool between the surface to be insulated and a casing, such as a metal sheet or a surfacing mat, the flocks being conveyed by a gas stream while at least one jet of aqueous binder is directed onto them (making it possible to prevent flyaway of dusts, to convey and to apply the flocks and to subsequently stiffen the layer, once dry) in order to form a layer delimited by the casing, before drying in order to remove the water. However, this process remains lengthy, presents problems of coalescence of the adhesively bonded flocks which can result in a non-homogeneity in density at certain points, the density of flocks obtained in addition generally not exceeding 60 kg/m$^3$, thus limiting the insulation performance qualities obtained.

The majority of the other insulators existing in other applications are for their part generally not suited to the insulation of installations subjected to high temperatures, these materials exhibiting, if appropriate, better thermal performance qualities at ambient temperature but being able to deteriorate or lose their good heat performance qualities at high temperature or over time. This is the case, for example, with cellular organic insulators of expanded polymer or foam type, these materials degrading in particular at high temperature. In the same way, vacuum insulators, as well as aerogels, are not conventionally used in ovens, these insulators, due to their nature and/or composition and/or components, exhibiting potential risks of degradation or of loss of their thermal performance qualities at high temperature and/or exhibiting a stiffness which does not allow them to conform to the contours of the oven. In addition, the binders, in particular organic binders, generally used in insulators in order in particular to provide them with mechanical integrity can, if appropriate, bring about undesirable gaseous emissions during the first operating cycles of the oven or at high temperature, for example during pyrolysis cycles.

BRIEF SUMMARY

As the improvement in the energy performance qualities of ovens, at the same time as a relatively simple design and a robust and reliable structure, with good preservation of the performance qualities over time, remain desired and sought after by manufacturers of household electrical appliances, and also by users, the present invention has thus sought to develop a novel installation (or appliance or device), in particular a domestic or household installation, operating at high temperature (in particular between 50 and 350° C.), such as a cooking oven, and which makes it possible to overcome at least one of the disadvantages set out above, in particular exhibiting good thermal performance qualities and an improved energy consumption, this installation being in addition advantageously simple in design, long-lasting and reliable in use from its first use.

DETAILED DESCRIPTION

Figure 1:
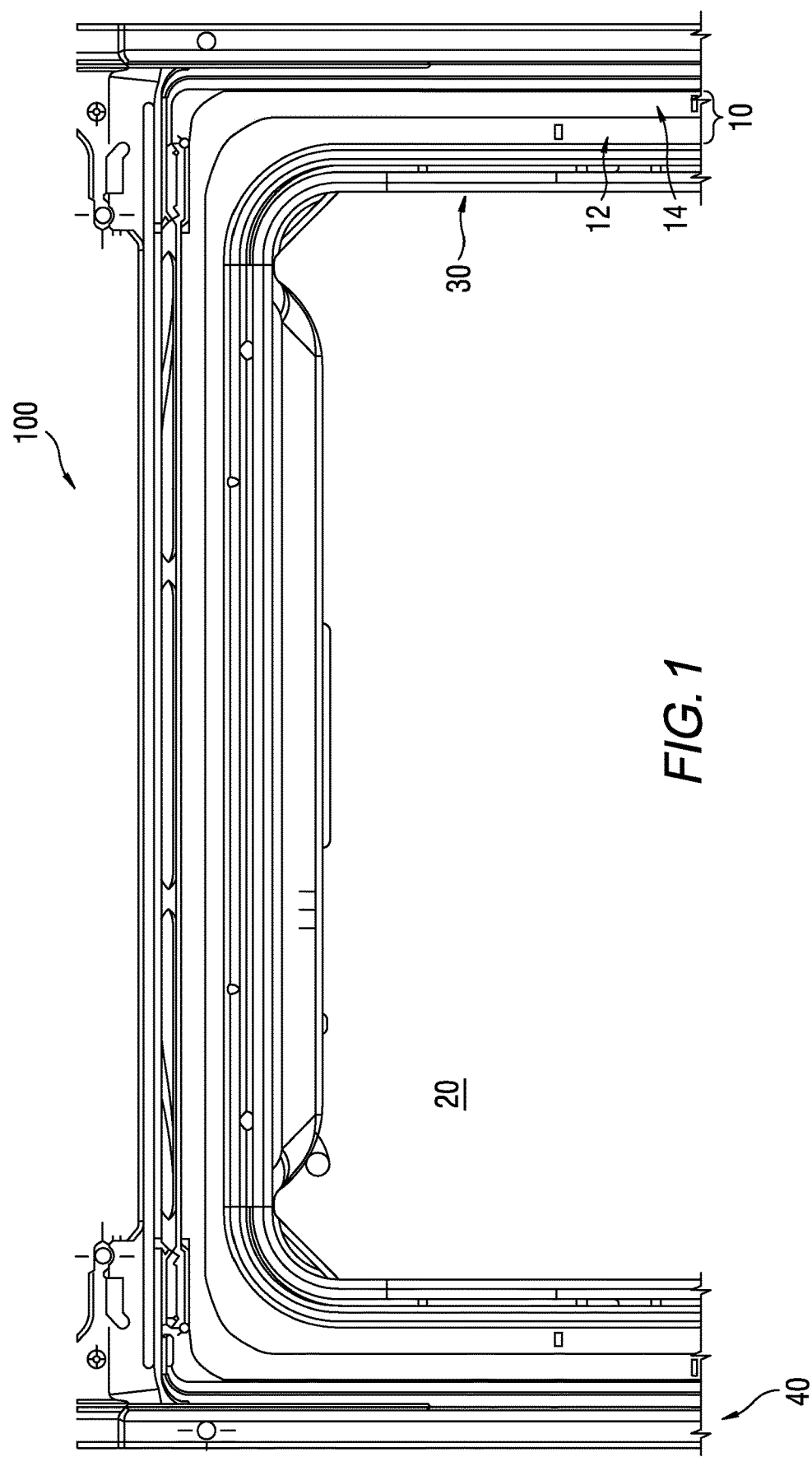
FIG. 1 shows a first exemplary embodiment of a device that operates at high temperatures.
Figure 2:
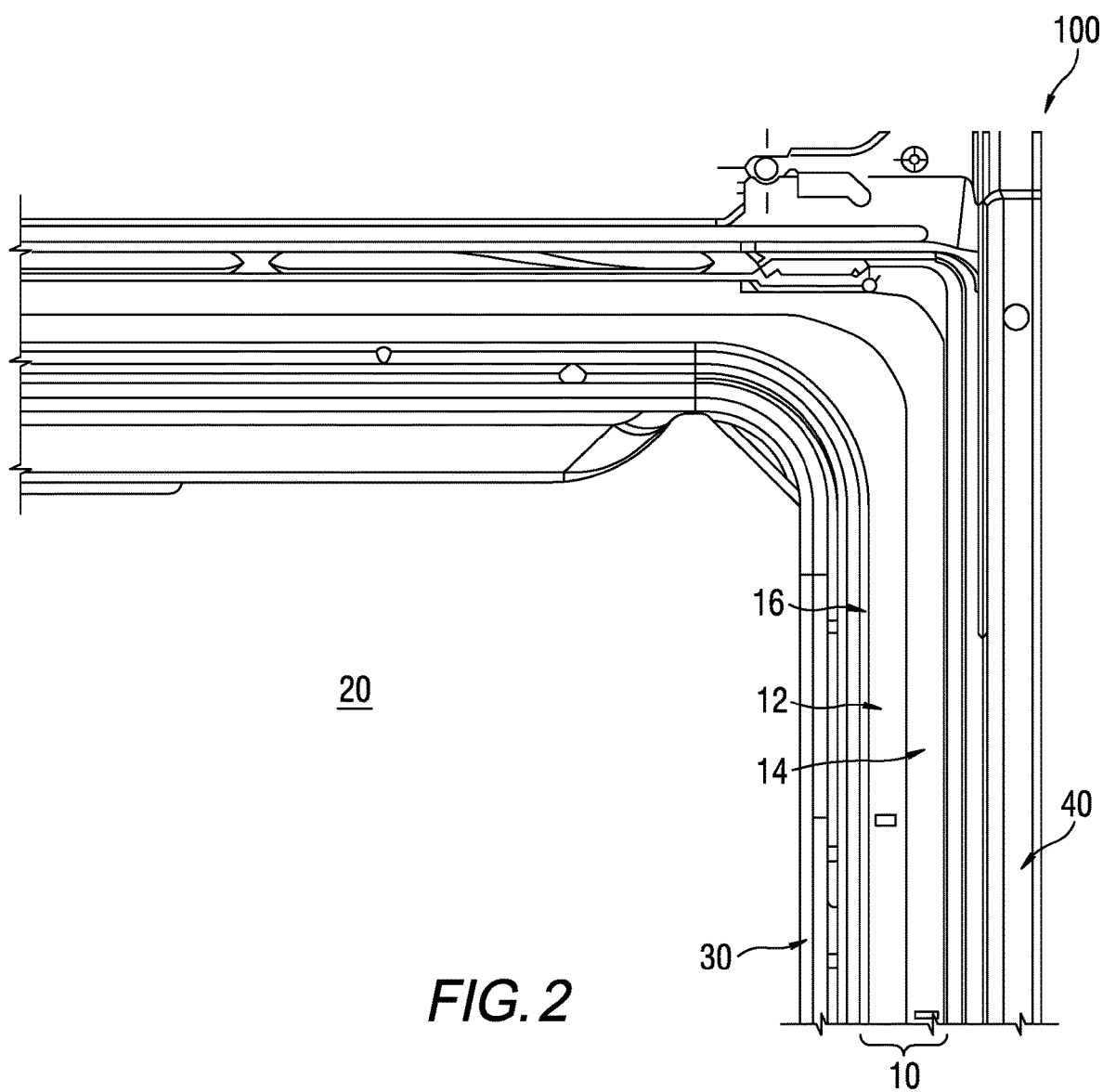
FIG. 2 shows a second exemplary embodiment of the device.

This aim has been achieved by the device (or appliance) according to the invention, operating at high temperature (greater than ambient temperature), especially up to 450° C. or even 550° C. and in particular between 50 and 350° C., this device being especially an oven or an oven part. As shown in FIGS. 1 and 2, this device 100 comprises (or is provided with) at least one (thermally) insulating product 10, the said product being formed of at least two layers, a first layer 12, placed (or turned) towards (or on the side of or the nearest to or the closest to (comparatively with respect to the second layer)) the heating zone 20 (or cooking zone, more particularly the internal space or box or inner shell 30 to be insulated, that is to say, for an oven, the muffle or the (internal) heating/cooking enclosure in which the elements to be heated/cooked are placed) and/or the heating element or elements (for example, one or more resistors) of the device to be insulated, the said first layer being formed of mineral wool(s) and/or fibre(s) and having a density of less than 120 kg/m³, and a second layer 14, further away ((than the first) from the said heating zone and/or from the said heating element or elements or also turned in the opposite direction from the first (especially towards the outside or outer shell 40 of the device)), the said second layer been chosen from (super)insulators, formed (at least in part) of aerogel(s) or of amorphous silica (in particular fumed or precipitated silica), or vacuum insulators or optionally any other superinsulator.

Superinsulator is understood to mean an insulator exhibiting a thermal conductivity of less than 22 mW/m·K at the temperature of 10° C. (the thermal conductivity being measured in particular according to Standard EN12667). The insulators formed (at least in part) of aerogel(s) or of amorphous silica (in particular fumed or optionally precipitated silica) or the vacuum insulators are preferred examples according to the invention of insulators of superinsulator type used to form the abovementioned second layer.

The present invention also relates to the thermal insulation product (or insulator or insulating product) suited to the insulation of the abovementioned high-temperature device (device which can be used at high temperature). This insulating product, in particular suited to (or intended for) the insulation of ovens (in particular ovens for domestic use), is a product formed of at least two layers, a first layer, intended to be placed towards (or the nearest to, in comparison with the second layer) the heating zone and/or the heating element or elements (of the device) to be insulated, formed of mineral wool(s) and/or fibre(s) and with a density of less than 120 kg/m³, and a second layer, further away, chosen from insulators formed of aerogel(s) or of amorphous silica or vacuum insulators or optionally any other superinsulator.

The labels "first" and "second" are, in the present text, used simply for the purposes of distinguishing the two layers but do not necessarily imply a consecutive positioning of these layers, it being possible in particular for one or more additional layers, especially intermediate layers, to be provided, as indicated subsequently.

The present invention, by the selection and the combination in a given order (with the first layer positioned on the side of the heating zone and/or elements, this first layer thus being placed between 1) the said zone and/or the said element(s) and 2) the second layer, the latter being further away—than the first layer—from the said zone and/or element or elements) of two specific layers having different characteristics and natures, makes it possible to obtain improved thermal insulation performance qualities. The use of the composite and multilayer insulating product according to the invention makes it possible in addition to improve the performance qualities as regards energy consumption of the ovens equipped with this product, in comparison with those of the ovens using normal insulators, while meeting the requirements in terms of safety, health and the environment. The second layer, formed of an insulator (of superinsulator type) nevertheless conventionally not used in ovens, unexpectedly undergoes, in the present invention, very little degradation in use as a result of its combination with the first layer according to the invention in the order chosen, the emissions of undesirable gaseous products also being limited, this being the case from the first use of the oven provided, as insulator(s), with product(s) according to the invention (the insulator according to the invention thus being ready for use and being able to be inserted into the ovens without pretreatment), the product or the oven thus equipped remaining below the emission threshold for volatile organic components (VOCs) expected in this use, in particular exhibiting an emission of formaldehyde of less than or equal to 10 mg/kg (that is to say, of less than or equal to 10 mg of formaldehyde emitted/released per kg of the said insulating product), this emission being measured according to Standard NF EN 120 (measurement method with hot tube at 350° C.).

The insulating product according to the invention exhibits in particular an equivalent (or total) thermal resistance $R_{eq}$ of greater than 1.2 m²·K/W, preferably of greater than 1.3 m²·K/W, indeed even of greater than 2 m²·K/W, indeed even of greater than 2.5 m²·K/W. The equivalent thermal resistance $R_{eq}$ correspond to the sum of the thermal resistances $R_i$ of each layer (i) forming the insulating product according to the invention, each thermal resistance $R_i$ corresponding to the ratio of the thickness of the layer under consideration to its thermal conductivity $\lambda_i$, these values being determined by measurement at 10° C., according to Standard EN12667.

The thermal insulating product according to the invention also exhibits a good fire resistance (in particular a fire resistance of class Al according to Standard EN 13501-1), a good mechanical strength and a good durability (or resistance to aging).

The insulating product with its twofold composition according to the invention incorporating a relatively flexible first layer also makes it possible to match the contours of the elements or walls or cavities of the device, in particular oven, on or in which the insulators are positioned, and also makes it possible to reduce the problems of thermal bridges and to improve the insulation performance qualities obtained. The cavities into which the insulators are generally led to be inserted in these devices are hollow spaces, in particular three-dimensional spaces, around the internal (heating/cooking) space (or muffle or internal enclosure or box) of the device to be insulated (these cavities on the side, upper and lower parts or faces of the muffle of an oven forming, for example, what is known as the belt, the cavity at the rear of an oven (with respect to the front of the oven provided with the opening allowing access to the inside of the muffle) also being one of the cavities to be insulated around the muffle). The said "three-dimensional spaces" are understood to mean internal spaces or cavities delimited by two main surfaces facing one another, one at least (but preferably both) of which has a three-dimensional shape, that is to say a not rigorously flat shape, in particular can be a sequence of contiguous planes connected by elbows as right angles or curves. A specific surface shape delimiting a three-dimensional cavity can be inscribed in an essentially cubic shape.

The insulating product according to the invention is advantageously positioned, at each location or in each cavity concerned (where the insulator has to be placed in order to insulate the abovementioned heating zone and/or element(s)), so that the first layer is placed on the side of the heating zone and/or of the said heating element or elements, as indicated above. The first layer can be placed, if appropriate, in direct contact with the heating zone or more particularly with the (part of) wall or the casing or the muffle or the box delimiting the said zone and on which the insulator is placed or, if appropriate, at least one interlayer element or layer can be inserted between the said heating zone/the said heating elements and the said first layer, in particular a layer for limiting the radiative exchanges towards the insulator, inserted between the zone/the element to be insulated and the insulating product, it being possible for this additional layer, if appropriate, to form part of the insulating product as subsequently specified and preferably being of low emissivity (less than 0.4, for example an aluminium sheet or layer, as subsequently specified), the emissivity being measured by means of a measuring device of Spectrum 100 reference sold by PerkinElmer for a spectrum with a wavelength of 5 to 50 µm.

As indicated above, the first type of layer forming the insulator used according to the invention is a, indeed even several, fibrous layer(s) formed of mineral wool(s) and/or fibre(s), in particular of the type of mat(s) (or bed(s) or web(s) formed of entangled fibres (in particular yarns and/or filaments)). This layer can be formed in a known way, for example by deposition of fibres, resulting from a spinneret or from another fiberizing device (in particular obtained by centrifugation and then attenuated), on a belt and optionally joining of the fibres together by mechanical attaching, in particular by needling, or by chemical bonding by means of a binder applied to the fibres.

The fibrous layer used can be formed of different types of fibres. Preferably, fibrous layers are chosen such that a majority (at least 50% by weight, in particular at least 75% or at least 80% by weight of the fibres), indeed even advantageously all, of the fibres of each layer are inorganic/mineral fibres, it being possible for these fibres in particular to be chosen from glass fibres (or glass wool), rock fibres (or rock wool), ceramic fibres, basalt fibres, and the like, and these fibres preferably being glass fibres (for example fibres of E or C glass) or rock fibres or ceramic fibres.

These layers can also exhibit, if appropriate, a binder (in particular having an aqueous base, it being possible for this binder, if appropriate, to comprise different organic or inorganic compounds (resin(s), additive(s), and the like)), making it possible in particular, in a fibrous layer, to bond the fibres together, and/or additives resulting from their manufacture. The content of binder in the fibrous layer used preferably does not exceed 8% by weight (of dry matter or dry binder) with respect to the layer, this binder generally being already polymerized or crosslinked or cured or hardened or having already reacted, and preferably being inorganic or mineral.

One or more additives and/or fillers can also be present, if appropriate, in particular when one or more additional properties and/or functions are desired, for example one or more additives of the type of mineral or silicone oil, opacifier(s), and the like, the content of these additives preferably being less than 5% by weight (for all of the additives), in particular less than 1% by weight, of the layer.

The first layer used is advantageously essentially (indeed even solely) mineral. The content of organic components present (evaluated in particular by measuring the weight of the material before and after calcination) is advantageously less than 0.5%, in particular less than 0.2%, by weight of the layer, the layer preferably being devoid of organic compounds.

The first layer additionally exhibits a density of less than 120 kg/m$^3$, especially of less than 100 kg/m$^3$, in particular of between 20 and 100 kg/m$^3$, and preferably of less than or equal to 80 kg/m$^3$, indeed even of less than or equal to 70 kg/m$^3$, and preferably of greater than or equal to 30 kg/m$^3$, indeed even of greater than or equal to 50 kg/m$^3$, in particular of between 30 and 80 kg/m$^3$ or between 50 and 80 kg/m$^3$, in particular ranging from 30 to 70 kg/m$^3$ inclusive or from 50 to 70 kg/m$^3$ inclusive, the thickness of this first layer in addition preferably being between 10 and 50 mm, in particular between 15 and 40 mm (in particular ranging from 15 to 35 mm inclusive).

Use may in particular be made, by way of example, as first layer(s), of the beds made of glass wool or of rock wool sold by Saint-Gobain Isover under the Aiguilène 65/35, Aiguilène 70/25, Aiguilène 60/25 or TNF 18/30 brand.

Preferably, the first layer forming the insulating product used according to the invention is based on fine mineral wool(s) and/or fibre(s) for good insulation performance qualities. Particularly advantageously according to the invention, use is made of layers of (or made of) glass wool(s) (or fibre(s) with a micronaire of less than 25 l/min, in particular of between 3 and 18 l/min, or of layers of rock wool(s) (or fibres) with a fasonaire of greater than 150 mmwc and of less than 350 mmwc (millimetres water column), in particular of between 200 and 350 mmwc.

The fineness of glass fibres is often determined by the value of their micronaire (F) under 5 g. The measurement of the micronaire, also known as "fineness index", gives an account of the specific surface by virtue of the measurement of the aerodynamic pressure drop when a given amount of fibres is subjected to a given pressure of a gas—generally air or nitrogen. This measurement is standard in units for the production of mineral fibres, it is carried out according to Standard DIN 53941 or ASTM D 1448 and uses an appliance known as "micronaire appliance".

However, such an appliance exhibits a measurement limit when the fibres used are fine. For very fine fibres, it is possible and preferable to measure the fineness (or the "micronaire") in l/min by virtue of a known technique described in Patent Application WO2003/098209. This patent application relates to a device for determining the fineness index of fibres comprising a device for measuring the fineness index, the said measuring device being provided with at least a first orifice connected to a measurement cell appropriate for receiving a sample consisting of a plurality of fibres (in the present case, a sample of the fibrous layer) and with a second orifice connected to a device for measuring a differential pressure located on either side of the said sample, the said device for measuring the differential pressure being intended to be connected to a device for the production of a fluid flow, the measuring device additionally comprising at least one volumetric flow meter for the fluid passing through the said cell. This device gives correspondences between "micronaire" values and litres per minute (l/min).

For its part, the fasonaire is determined in the following way: a test specimen (5 g), consisting of a tuft of mineral wool (in the present case, a sample of the fibrous layer) devoid of oil and of binder but possibly comprising nonfibrous components (slug), is weighed. This test specimen is compressed into a given volume and is traversed by a stream of gas (nitrogen or dry air) maintained at a constant flow rate. The fasonaire measurement is then the pressure drop through the test specimen, evaluated by a water column graduated in conventional units. Conventionally, a fasonaire result is the mean of the pressure drops observed for ten test specimens, the measurement being expressed in millimetres of water column (mmwc).

As indicated in the definition of the invention, the second type of layer of the insulator used according to the invention is formed of (at least) an insulator of superinsulator type chosen in particular and advantageously from insulators based (at least in part) on aerogel(s) or on amorphous silica or from vacuum insulators (VIP), and particularly preferably chosen from insulators based on amorphous silica, in particular and advantageously based on fumed silica, or chosen from vacuum insulators (VIP). The thickness of this second layer is preferably between 3 and 30 mm (in particular ranges from 5 to 25 mm, indeed even from 5 to 15 mm, limits included). Preferably, the second layer used to form the insulator according to the invention also exhibits a density of between 100 and 350 kg/m³, in particular between 100 and 300 kg/m³ and especially ranging from 150 to 280 kg/m³.

In the case of an insulator (or insulating material) based on aerogels, this can incorporate the aerogels in different forms (in particular in the form of beads or particles) or synthesized in different ways.

The aerogels are generally obtained from a gel, for example manufactured by hydrolysis in the presence of a solvent then gelling with catalysis starting from a precursor and then by evaporation or extraction of the liquid forming the gel (for example under supercritical or subcritical conditions), in order to replace the said liquid with a gas (in particular air) without collapse of the porous structure. The aerogels thus formed are highly porous materials, having open pores, the size of the pores of which is nanometric. The aerogels are provided in particular in the form of translucent granules or of particles or granules or beads or powder, it being possible for these aerogels to be used within mats (or webs) formed of entangled fibres.

The aerogels of the second layer are advantageously inorganic aerogels, in particular based on oxides, such as aerogels based on silica, on aluminium and/or on titanium, and preferably comprise at least one silica aerogel, in particular are essentially (for at least 50% and preferably for 100% by weight aerogels) or solely silica aerogels.

Each layer based on aerogel(s) (or including aerogels or aerogel or formed (at least in part) of aerogel(s)) used, if appropriate, according to the invention preferably exhibits a content of aerogel(s) of between 25% and 95% and preferably of between 40% and 85% by weight of the said layer, and can exhibit, if appropriate, from 5% to 75% (in particular from 20% to 40%) by weight of fibres. This is because the layer based on aerogel(s) is provided in particular in the form of a fibrous layer (or layer formed of fibres), in particular of the mat (or bed or web formed of entangled fibres) type, forming a porous or "noncontinuous" structure including aerogels. Each fibrous layer can be formed in a known way as seen above for the first type of layer. The aerogels can be incorporated in the fibres in different ways, either by mixing with preformed aerogels (manufactured independently of the fibrous layers) or by impregnation of the fibrous layers with or in a solution making it possible to form the aerogels in situ, for example by impregnating the layers with (a solution containing) the reactants making it possible to obtain the aerogels, the extraction of the liquid and the gelling being carried out (in particular under supercritical conditions) in order to obtain insulating layers including aerogels. Examples of layers or mats of aerogels (reinforced by fibres), especially produced by impregnation, are in particular mats of aerogels sold under the Spaceloft® or Pyrogel XT-E reference by Aspen Aerogel Inc.

As seen above for the first layer, each fibrous layer including aerogels can be formed from different types of fibres, the majority (at least 50% by weight, in particular at least 75% or at least 80% by weight of the fibres), indeed even advantageously all, of the fibres of each layer preferably being inorganic/mineral fibres, it being possible for these fibres in particular to be chosen from glass fibres (or glass wool), rock fibres (or rock wool), ceramic fibres, basalt fibres, and the like, and these fibres preferably being glass fibres (for example fibres of E or C glass) or rock fibres.

This type of insulator advantageously exhibits a thermal conductivity of less than 22 mW/m·K at the temperature of 10° C., in particular of less than 20 mW/m·K, and its thickness is generally from 5 mm to 10 mm inclusive. If appropriate, two of these insulators can be assembled (for example superimposed and adhesively bonded together) to form the second layer.

The insulator or insulators formed of (or based on) amorphous silica(s) (in particular fumed silica or precipitated silica) which can be used to form the second layer of the insulator according to the invention generally consist of amorphous silica powder within a fibrous layer (the powder being, for example, encased or encapsulated by or in the said layer), the said fibrous layer being provided, for example, in the form of fabric(s) of fibres (in particular of glass E fibres), for example in the form of two fabrics sown so as to form cells intended to contain silica powder. The silica powder can thus be enclosed in cells of fabric(s) which are delimited by stitches. Each layer based on amorphous silica (or including amorphous silica) used, if appropriate, according to the invention preferably exhibits a content of amorphous silica of between 50% and 90% and preferably of between 60% and 80% by weight of the said layer, and can exhibit, if appropriate, from 10% to 50% (in particular from 20% to 40%) by weight of fibres (with respect to the layer formed of the fibres and the silica). If appropriate, an additive, such as an opacifying agent, can be mixed with the silica powder in order to limit radiative transfers.

This type of insulator advantageously exhibits a thermal conductivity of less than 20 mW/m·K at the temperature of 10° C., in particular of less than 18 mW/m·K, and its thickness is generally from 5 mm to 15 mm inclusive. If appropriate, two of these insulators can be assembled (for example superimposed and adhesively bonded together) to form the second layer.

Examples of insulators (or layers of insulators) based on amorphous silica (in particular on fumed silica) are in particular insulators sold under the Siltherm M-5200 reference by Siltherm or under the Microtherm Quilted 1000R reference or the Slimflex reference by Promat.

The vacuum insulator or insulators which can be used to form the second layer of the insulator according to the invention are generally formed of one or more cores (or nuclei or cells) generally including a porous material capable of withstanding the external pressure, these cores been surrounded and delimited by a casing sufficiently leaktight to maintain the vacuum (pressure generally of less than 0.5 mbar) produced within the core or cores. The material within the core or cores can be a fibrous material, for example based on glass or rock fibres or on ceramic fibres, and/or a powdered material, such as silica (for example fumed or precipitated silica) powder, this material being, if appropriate, shaped and retaining its shape once under vacuum. The casing delimiting the core or cores (and making it possible to maintain them under vacuum) can be formed of one or more layers, for example can be formed of one or more plastic or polymer films, which can, if appropriate, be metallized or metallic, and/or can be formed of one or more fibrous layers. One or more sheets of aluminium or of polyethylene terephthalate or of polyethylene or of polypropylene or of steel, and the like, can in particular form the said casing, the thickness of each layer or sheet generally not exceeding 100 μm. The casing can, if appropriate, be formed of different layers and/or sheets according to the side of the casing under consideration.

The density of this type of insulator is generally between 100 kg/m³ and 300 kg/m³ (after placing under vacuum) and is preferably between 150 kg/m³ and 250 kg/m³. The porosity of the material used within each nucleus is preferably greater than 75% (by volume) and in particular greater than 90%. If appropriate, one or more additives, such as an opacifier, can be added to this/these material(s) in order, for example, to limit the radiative transfers in the material(s).

When the vacuum insulator comprises several separate nuclei, these nuclei can be within one and the same casing sealed between each nucleus, it being possible for the optional folding and/or the optional cutting of these insulators to be carried out at the sealing zones, outside the zones occupied by the nuclei. The vacuum insulator is provided in particular in the form of a rigid panel or of an assembly of rigid panels, if appropriate bonded together by one and the same casing or which can be bonded together, in the insulator or the device provided with the insulator according to the invention, by the first layer (the vacuum insulator can thus be assembled with the first layer in the form of several initially separate panels, for example by combining one vacuum panel per face of a heating box to be insulated, on a first layer which itself can be continuous from one face to the other).

This type of insulator (vacuum insulator) advantageously exhibits a thermal conductivity of less than 10 mW/(m·K) at the temperature of 10° C., in particular of less than 6 mW/(m·K) and preferably of less than 4 mW/(m·K), and its thickness is generally between 5 mm and 25 mm, in particular is from 5 mm to 15 mm. The vacuum can be implemented in the nuclei during or after the production of these insulators. If appropriate, two of these insulators can be assembled (for example superimposed and adhesively bonded together) to form the second layer.

Examples of vacuum insulators are in particular insulators sold under the U-Vacua reference by Panasonic.

The different types of layers (comprising, at least or solely, the abovementioned first layer and the abovementioned second layer) according to the invention are combined, at the latest in situ during the installation of the insulator or insulators in the device to be insulated, in order to form the insulating product according to the invention, it being possible for these layers to be simply superimposed and/or held together and/or around the region or regions or element or elements to be insulated by hooping and/or insetting, or it being possible for these layers to be advantageously bonded together by adhesive bonding (using inorganic adhesives or binders, for example adhesives of silicate type) or by sewing, and the like, it also being possible for one or more layers to be added, in particular inserted between the two abovementioned types of layers, and/or at the surface of one and/or other of the abovementioned layers (for example at the surface of the first layer, as seen above), in order optionally to further improve the thermal insulation performance qualities or other performance qualities.

In particular, as shown in FIG. 2, the product according to the invention can, if appropriate, comprise a third layer, or several other layers, in particular an interlayer layer (16 in FIG. 2) between the first layer and the second layer and/or between the (heating) zone/element(s) to be insulated and the first layer and/or on the side of the second layer furthest from the zone and/or element(s) to be insulated, for example and advantageously a layer of low emissivity, in particular with an emissivity of less than 0.4 for wavelengths from 5 to 50 μm (the emissivity being measured by means of a measuring appliance with the Spectrum 100 reference sold by PerkinElmer), such as a layer or sheet of aluminium (or made of aluminium). The thickness of this additional layer or of each of these layers, in the case in particular of aluminium layer(s), can in particular be of the order of 10 to 45 μm (limits included). If appropriate and advantageously, the product according to the invention can comprise three or at least three of these additional layers, in particular three aluminium layers, the assemblage being provided in particular at least as follows: aluminium/first layer/aluminium/second layer/aluminium, it also being possible for each abovementioned aluminium sheet or layer alternatively to be optional (the assemblage then comprising only one or two of these aluminium sheets or layers, for example).

The product according to the invention or one of its layers can also comprise a facing (which can also be an aluminium layer as mentioned above) or coating, for example can be coated with or comprise a surfacing mat, an adhesive, a coat, and the like, if appropriate applied at the surface, on one face or the whole of the product or of the layer, in particular in order to limit dust, to protect the product, to strengthen it, to allow it to be handled, and the like; for example, in the case in particular of a first layer in the form of a needled web of rock wool, the latter can be coated with an aluminium sheet in order to help in the handling thereof and, in the case of a vacuum panel, the latter can be entirely coated with aluminium, and the like.

As seen above for the first layer, each other layer of the insulator according to the invention (such as the second layer) can exhibit, if appropriate, a binder and/or additives and/or fillers resulting from its manufacture, the binder(s) present, if appropriate, preferably being inorganic (or mineral), and the content of additives preferably being less than 1% by weight (for the combined additives), in particular less than 0.5% by weight, of the said layer.

As seen above for the first layer, each other layer of the insulator according to the invention (in particular the second layer), as well as the insulator thus formed according to the invention, is advantageously essentially (indeed even solely) mineral. The content of organic components present in the insulating product according to the invention is advantageously less than 20% by weight, in particular less than 10% by weight and preferably less than 5% by weight of the said product.

If appropriate, the insulating product can combine at least one continuous layer and at least one noncontinuous layer, in particular at least a continuous first layer and a noncontinuous second layer (which can be formed of more rigid insulators, such as vacuum insulators), in particular formed of noncontinuous panels (for example, in order to insulate the belt of an oven, being provided in the form of four panels, each panel having to coincide with one face of the muffle or of the heating enclosure to be insulated) appropriately distributed over the first layer and which can be held together, if appropriate, by the said first layer or by other means in the device to be insulated, such as hooping, or also adhesive bonding (the noncontinuous panels being, for example, each adhesively bonded to an interior face of the case forming the external casing of the oven, the first layer wound around the heating box/zone then being combined with the second layer during the fitting and the closing of the case).

The product according to the invention preferably exhibits a density (or voluminal mass) of in particular between 60 and 300 $kg/m^3$, preferably between 100 and 250 $kg/m^3$, in particular between 150 and 250 $kg/m^3$.

The insulating product according to the invention is generally provided in the (semi)rigid form (in particular in the form of a multilayer web formed of at least the two abovementioned layers, for example sown or adhesively bonded together or exactly juxtaposed during the insulation of the oven, it being possible for the two layers to have been cut and conditioned separately), and is shaped and/or cut, if appropriate, to the dimensions required before being inserted/positioned in the place or places to be insulated in order to obtain the device according to the invention. It can in particular be fixed to or around the elements or walls or in the cavities to be insulated by different means. It is suitable in particular for the insulation of the heating box or muffle of ovens (whether at the door, the rear face or the side, lower and upper faces) and/or for the insulation of the heating elements and the protection of the other elements of the oven (such as lamps). The thermal performance qualities of the insulator according to the invention are reflected by equivalent thermal resistance values advantageously of greater than 1.2 m² K/W, as seen above. The product according to the invention also exhibits an emission of formaldehyde of less than or equal to 10 mg/kg, as seen above, the emitted formaldehyde content being measured in particular according to Standard NF EN 120, especially by placing 10 g of sample in a tubular oven at 350° C., a gas stream of reconstituted air passing through the sample for 1 h, the formaldehyde given off being trapped in two bubblers in series filled with 50 ml of water, and its cumulative amount in the two bubblers being measured by the Lange method, the measurement being carried out on a Hermann Moritz tubular oven.

The device according to the invention is preferably an oven, indeed even an oven part, such as a cooking enclosure, in particular for domestic or optionally other use (for example for industrial use), within which the temperatures can occasionally reach 450° C. for example, indeed even 550° C., indeed even optionally more, this device comprising or being coated with at least one insulating product as defined above. The oven generally comprises at least one muffle or heating box or enclosure delimiting the heating zone, this muffle generally being made of metal or refractory material, the insulating product normally being positioned around this muffle. Advantageously, the device according to the invention comprises, as insulating product(s), only the one or more of the abovementioned insulating products according to the invention.

A better understanding of the present invention and its advantages will be obtained on reading the examples which follow, given solely by way of illustration and which cannot under any circumstances be regarded as limiting.

Reference Example 1

In this example, the thermal conductivity of a layer in the form of a needled mat of glass C wool sold under the Aguilène 70/35 reference by Saint-Gobain Isover France, with a thickness of 35 mm and a density of the order of 70 kg/m³, was determined (thermal conductivity measurements λ (necessary for the calculation of the thermal resistance) carried out at 10° C. according to Standard EN 12667).

The thermal resistance R (corresponding to the ratio of the thickness of the insulator to the thermal conductivity λ) obtained was 1.1 m²·K/W.

An oven, of reference De Dietrich DOP1180BU sold by Brandt, was subsequently equipped with an insulating interior belt, using, in order to form this belt, the above glass wool mat, and the consumption of the oven was measured according to Standard IEC 60350. The energy consumption of the oven was measured in conventional heat mode, with heating of 180° C. (with respect to an initial ambient temperature of 23° C.) corresponding to a temperature at the centre of the oven of 203° C. The consumption of the oven was 760 Wh in this reference example.

Reference Example 2

In this example, a layer of glass wool with the same density and structure as in the preceding Reference Example 1 but this time exhibiting a thickness of 25 mm was combined (by superimposing them, the assembly being maintained by hooping, during the positioning thereof in the oven, using metal rods) with a layer of superinsulator with a thickness of 10 mm, in the form of two fabrics of glass E fibres connected by chequered stitches bringing about cells each including fumed silica powder, this superinsulator based on fumed silica exhibiting a density of the order of 200 kg/m³ and being sold under the reference Siltherm M-5200 by Siltherm.

The equivalent thermal resistance (sum of the thermal resistances of each layer forming the insulating product, each thermal resistance corresponding to the ratio of the thickness of the layer under consideration to its thermal conductivity, these values being determined by measurement at 10° C. according to Standard EN12667) of the multilayer insulator thus formed was determined. The equivalent thermal resistance $R_{eq}$ obtained was 1.4 m²·K/W.

The oven, of reference De Dietrich DOP1180BU, mentioned in the preceding example was this time equipped with an insulating interior belt (positioned around the walls delimiting the heating box, or muffle, of the oven, in the cavities present between these walls and the exterior case of the oven), this time using the multilayer insulator of the present Reference Example 2, the layer of superinsulator being placed the closest to the heating zone, and the consumption of the oven was measured as in the preceding example in conventional heat mode, with heating of 180° C. (with respect to an initial ambient temperature of 23° C.). The consumption of the oven was 780 Wh in this reference example, i.e. a greater consumption than by using the mineral wool mat alone. Surprisingly, even though the equivalent thermal resistance obtained for the multilayer insulator according to the present Reference Example 2 was thus greater than that of the monolayer insulator used in Reference Example 1, normally implying a better insulation which has to result in better performance qualities being obtained, the use of the multilayer insulator in the configuration as described in the present Reference Example 2 thus resulted in a deterioration in the energy performance qualities of the oven.

Example 1 According to the Invention

The procedure was carried out as in Reference Example 2, the position of the superinsulator layer and that of the mineral wool layer being reversed so that the first layer closest to the heating zone is the mineral wool layer and the second, more distant (with respect to the first layer), layer is the superinsulator layer. The equivalent thermal resistance $R_{eq}$ of the insulator was, as above, 1.4 m²·K/W.

The oven mentioned in the preceding examples was thus equipped this time with an insulating interior belt, the multilayer insulator of the present Example 1 according to the invention being used correctly positioned as indicated in the present example, and the consumption of the oven was measured, as in the preceding examples, in conventional heat mode with heating of 180° C. (with respect to an initial ambient temperature of 23° C.). The consumption of the oven was 680 Wh in this example according to the invention.

Thus, contrary to the Reference Example 2, and while the insulator according to the present example according to the invention exhibits an equivalent thermal resistance $R_{eq}$ identical to that of the said Reference Example 2, this time a significant reduction in the energy consumption of the oven is observed.

The insulator of the present example according to the invention, with its combination of layers with the various characteristics correctly positioned, thus makes possible a significant improvement in the thermal insulation of the oven, and also a significant reduction in the energy consumption of the oven.

Example 2 According to the Invention

A layer in the form of an aluminium sheet with a thickness of 20 μm was inserted, in the insulator of the preceding Example 1 according to the invention, between the above-mentioned first and second layers and the consumption of the oven (operating according to the same procedure as in the preceding examples with heating at the centre of the oven of 180° C.), the insulator of Example 1 according to the invention being replaced with the new insulator thus formed (comprising an additional intermediate layer), was again measured, the positioning of the first and second layers remaining the same as in the preceding example according to the invention (mineral wool layer closest to the heating zone and superinsulator layer furthest from the heating zone), the equivalent thermal resistance $R_{eq}$ of the insulator being, once again, 1.4 m²·K/W. The consumption of the oven was 670 Wh in this example according to the invention, i.e. an additional improvement in the energy consumption of the oven.

Example 3 According to the Invention

The aluminium layer was moved in the insulator of the preceding Example 2 according to the invention so that it is positioned between the first layer and the muffle of the oven and no longer between the first and second layers of the insulator. The consumption of the oven (operating according to the same procedure as in the preceding examples with heating at the centre of the oven of 180° C.), the insulator of Example 2 according to the invention being replaced with the new insulator thus formed, was again measured, the positioning of the first and second layers with respect to one another remaining the same as in Example 2 according to the invention (mineral wool layer closest to the heating zone and superinsulator layer furthest from the heating zone), the equivalent thermal resistance $R_{eq}$ of the insulator being, once again, 1.4 m²·K/W. The consumption of the oven was 660 Wh in this example according to the invention, i.e. an additional improvement in the energy consumption of the oven.

Example 4 According to the Invention

The second layer, in the insulator of the preceding Example 2 according to the invention, was replaced with an assembly of vacuum panels (each panel having to coincide with a face of the muffle of the oven to be insulated) appropriately distributed over the first layer (for the insulation of the belt, the insulator thus combines the first continuous layer made of mineral wool seen above, a continuous intermediate layer made of aluminium and a second layer in the form of four vacuum panels distributed over the first layer so that each panel coincides with a face of the muffle, the assembly being, in this example, maintained by hooping). The vacuum panels chosen were panels with a thickness of 10 mm sold under the reference U-Vacua by Panasonic. The equivalent thermal resistance $R_{eq}$ of the insulator was, this time, 2.3 m²·K/W.

The consumption of the oven (operating according to the same procedure as in the preceding examples with heating at the centre of the oven of 180° C.), the insulator of Example 2 according to the invention being replaced with the new insulator thus formed, was again measured, the positioning of the first and second layers remaining the same as in the preceding example according to the invention (mineral wool layer closest to the heating zone and superinsulator layer furthest from the heating zone). The consumption of the oven was 650 Wh in this example according to the invention, i.e. an additional improvement with respect to the preceding Example 2, where the second layer was this time based on fumed silica.

Example 5 According to the Invention

The aluminium layer was moved in the insulator of the preceding Example 4 according to the invention so that it is positioned between the first layer and the muffle of the oven and no longer between the first and second layers of the insulator. The consumption of the oven (operating according to the same procedure as in the preceding examples with heating at the centre of the oven of 180° C.), the insulator of Example 4 according to the invention being replaced with the new insulator thus formed, was again measured, the positioning of the first and second layers with respect to one another remaining the same as in Example 4 according to the invention (mineral wool layer closest to the heating zone and superinsulator layer furthest from the heating zone), the equivalent thermal resistance $R_{eq}$ of the insulator being, once again, 2.3 m²·K/W. The consumption of the oven was 635 Wh in this example according to the invention, i.e. an additional improvement in the energy consumption of the oven.

The results obtained show that the use of the insulating products according to the invention for the insulation of domestic ovens or for other high-temperature uses makes it possible to obtain improved energy performance qualities for the ovens equipped with these products, the said insulator exhibiting insulating performance qualities which are particularly satisfactory.

The insulating product used according to the invention is suitable in particular for the insulation of walls or components of domestic electrical ovens but can also be advantageously used for the thermal insulation of any other surface, especially for applications at (or for the insulation of products subjected to) high temperature.

The invention claimed is:

1. A device configured to operate at high temperature, the device comprising:
    a least one insulating product formed of at least two layers, including a first layer, placed towards a heating zone and/or a heating element(s) to be insulated, formed of mineral wool(s) and/or fibre(s) and having a density of less than 120 kg/m³, and a second layer, further away from said heating zone and/or said heating element than the first layer, the second layer being chosen from insulators formed of aerogel(s) or of amorphous silica or vacuum insulators or any other superinsulator, the second layer having a thermal conductivity of less than 22 mW/m.K at the temperature of 10° C.

2. The device according to claim 1, wherein said insulating product is positioned so that the first layer is placed in direct contact with the said heating zone or at least one interlayer element or layer is inserted between the said heating zone or the said heating elements and the said first layer.

3. The device according to claim 1, wherein said first layer exhibits a voluminal mass of less than 100 kg/m³, a thickness of the first layer in addition being between 10 and 50 mm.

4. The device according to claim 1, wherein said second layer exhibits a voluminal mass of between 100 and 350 kg/m³, a thickness of the second layer in addition being between 3 and 30 mm.

5. The device according to claim 1, wherein said insulating product comprises at least one third layer, the third layer being an interlayer layer between the first layer and the second layer and/or between the zone or element(s) to be insulated and the first layer and/or on the side of the second layer furthest from the zone and/or element(s) to be insulated.

6. The device as claimed in claim 1, wherein the device is an oven or an oven part.

7. The device as claimed in claim 1, wherein the high temperature at which the device operates is up to 550° C.

8. The device according to claim 2, wherein said insulating product is positioned so that the first layer is placed in direct contact with a wall or with a casing or with a muffle delimiting said heating zone.

9. The device according to claim 5, wherein said third layer is a layer with an emissivity of less than 0.4 for wavelengths from 5 to 50 µm.

10. The device according to claim 9, wherein said third layer is a layer of aluminum.

11. The device according to claim 1, wherein said second layer is a vacuum insulator formed of one or more cores including a porous material and surrounded by a casing that maintains a vacuum pressure of less than 0.5 mbar within the one or more cores.

12. An insulating product, said product comprising:
at least two layers, including a first layer to be placed towards a heating zone and/or a heating element(s) to be insulated, formed of mineral wool(s) and/or fibre(s) and having a density of less than 120 kg/m³, and a second layer, further away from said heating zone and/or said heating element than the first layer, chosen from insulators formed of aerogel(s) or of amorphous silica or vacuum insulators or any other superinsulator, the second layer having a thermal conductivity of less than 22 mW/m.K at the temperature of 10° C.

13. The insulating product according to claim 12, wherein an equivalent thermal resistance $R_{eq}$ of the insulating product is greater than 1.2 m²·K/W.

14. The insulating product according to claim 12, wherein a content of organic components present in said product is less than 20% by weight of said product.

15. The insulating product according to claim 12, wherein the insulating product is a high-temperature insulation of a device subjected to temperatures of up to 550° C.

16. The insulating product according to claim 12, wherein said second layer is a vacuum insulator formed of one or more cores including a porous material and surrounded by a casing that maintains a vacuum pressure of less than 0.5 mbar within the one or more cores.

17. The device according to Claim 1, wherein said second layer is an insulator formed of amorphous silica.

18. The device according to Claim 17, wherein the amorphous silica is fumed silica powder within a fibrous layer.

19. The device according to Claim 18, wherein the fibrous layer is in the form of two fabrics of fibres sown so as to form cells intended to contain the fumed silica powder.

20. The insulating product according to Claim 12, wherein said second layer is an insulator formed of amorphous silica.

21. The insulating product according to Claim 20, wherein the amorphous silica is fumed silica powder within a fibrous layer.

22. The insulating product according to Claim 21, wherein the fibrous layer is in the form of two fabrics of fibres sown so as to form cells intended to contain the fumed silica powder.

* * * * *